Sept. 27, 1966      J. SCHLEICH      3,275,168

DEVICES FOR REMOVING STORED MATERIAL FROM SILOS

Filed Sept. 24, 1964      2 Sheets-Sheet 1

Inventor
Josef Schleich
By Stevens, Davis, Miller & Mosher
Attorneys

Sept. 27, 1966    J. SCHLEICH    3,275,168
DEVICES FOR REMOVING STORED MATERIAL FROM SILOS
Filed Sept. 24, 1964    2 Sheets-Sheet 2

Inventor
Josef Schleich
By Stevens, Davis, Miller & Mosher
Attorneys

United States Patent Office 3,275,168
Patented Sept. 27, 1966

3,275,168
DEVICES FOR REMOVING STORED
MATERIAL FROM SILOS
Josef Schleich, Eichendorffstrasse 3,
Ansbach, Germany
Filed Sept. 24, 1964, Ser. No. 398,869
Claims priority, application Germany, Sept. 24, 1963,
Sch 33,910
17 Claims. (Cl. 214—17)

The invention relates to a device for removing stored material from a silo which has a cylindrical outer wall and an annular base, with a central opening, arranged in the interior of the silo, the material removing device having a carriage rotatably arranged in a roundabout-like manner in the region of the central opening, the carriage having an arm extending over the annular base.

In the known devices for emptying a silo which has a cylindrical outer wall and an annular base, the difficulty exists that milling arms for effecting the material removal can only be introduced through the central opening of the silo base in a cumbersome and time consuming manner and thereafter fixed in their operative position. This is partly due to the fact that the milling arms are too long, which leads to the additional difficulty that they extend over a large part of the central opening of the base and thus render difficult the removal of the material contained in the silo. It has already been proposed to provide a silo base which has a conical surface of funnel-like form and to arrange suitably inclined milling arms in its central opening. Even with such an arrangement, the abovementioned difficulty cannot be completely removed.

It is accordingly a main object of the invention to provide a simple and robust device for removing material from a silo, which does not have the disadvantages of previous constructions.

It is a further object of the invention to provide a device for removing material from a silo, which can be easily introduced into the central opening of the silo base and brought into its working position.

It is another object of the invention to provide a device for removing material from a silo which is suitable for use with silos of different diameters.

It is yet another object of the invention to provide a device for removing material from a silo, having a milling arm which can be introduced through a central opening of the silo base and centrally applied to a rotatable carriage, provided in the said opening, the milling arm being thereupon displaceable in the direction towards the periphery of the central opening into a position in which it extends over the annular base, the milling arm being fixable in this position on the rotatable carriage in such a manner that it is essentially clear of the central opening.

It has been found to be advantageous if the length of the milling arm and the diameter of the central opening of the silo base are equal to about one third of the silo diameter.

In a preferred embodiment of a device according to the invention, the rotatable carriage has a circularly bent U-shaped rail in which horizontally and vertically rotating rollers are mounted, the horizontally rotating rollers rolling on the inner peripheral wall of the central opening and the vertically rotating rollers rolling on a track fixed to the periphery of the central opening.

The milling arm preferably has a supporting member which projects laterally transversely to its longitudinally extending axis, by means of which it is mounted on two connecting beams of the rotary carriage and by means of which it can be fixed in position. Rollers may be arranged on the supporting member which facilitate sliding of the scraping arm on the reinforcing beams.

In a preferred embodiment of a device according to the invention, a drive motor is fixed on the rotary carriage, which places the rotary carriage in rotation. The milling arm preferably has a milling chain which runs over chain wheels one of which is driven by a motor fixed on the milling arm, the milling chain being fitted with milling tools.

It has been found to be particularly advantageous if the milling arm can be applied to the rotary carriage while being maintained horizontal and can be displaced into a horizontal working position.

For obtaining an arch in the material present in the silo above the rotary carriage, it is advantageous if upwardly extending hooks are arranged on the rotary carriage.

In a further preferred embodiment of a device according to the invention, a hopper with a removal opening is arranged below the central opening of the base. Furthermore, the milling arm may be arranged for being displaced by means of a cable arrangement provided on the rotary carriage.

The above and other objects and advantages of the invention will be clear from the following description which is given with reference to the accompanying drawings which are given by way of example and in which.

Figure 1:
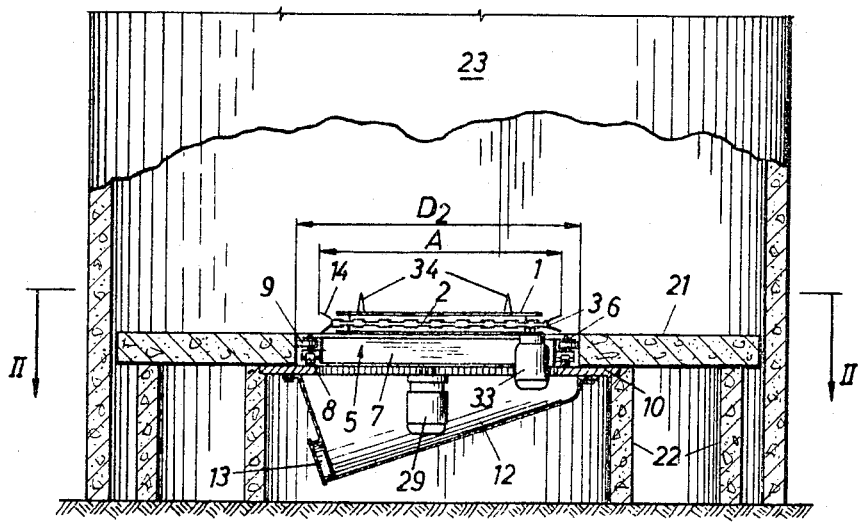
FIG. 1 is a side elevation of a silo, partly broken away, showing a milling arm provided on a rotary carriage, the milling arm being in its central position.
Figure 2:
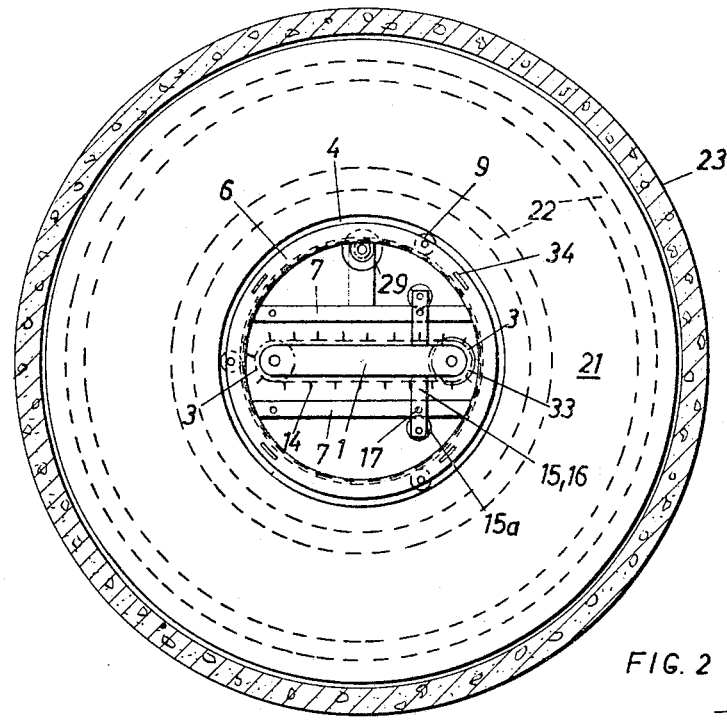
FIG. 2 illustrates a section through the silo along the line II—II of FIG. 1.

The silo illustrated in FIGS. 1 and 2 has a cylindrical outer wall 23 in which an annular base 21 is arranged. The base 21 can either be fixed directly to the outer wall 23 of the silo or, as illustrated, it can rest on supports 22, for example supporting cylinders. The annular base 21 has a central opening 4. An annular track 10 is fixed on the underside of the central opening and a circular rotary carriage 5 runs in a roundabout-like manner on this track 10. In the illustrated embodiment, the rotary carriage has a circularly bent rail 6 which is reinforced by two transverse beams 7. Vertically rotating rollers 8 and horizontally rotating rollers 9 are arranged on the rail 6. The vertically rotating rollers 8 run on the track 10 and thus give the rotary carriage 5 its possibility of rotary movement. The horizontally rotating rollers 9 abut against the inner peripheral wall of the central opening 4 of the base.

In the interior of the rotary carriage, a drive motor 29 is arranged which by means of a driving pinion is in engagement with a toothed ring arranged on the inner peripheral wall of the central opening 4. In this manner, the rotary carriage 5 can be driven by the motor 29.

The central opening 4 is downwardly terminated by a hopper 12, by means of which the material to be removed from the silo is drawn, the material passing out of the central opening 4. The hopper 12 has a discharge opening which is closed by a cover 13.

A milling arm 1 is mounted on the rotary carriage 5. The milling arm 1 has a milling chain 2 running on chain wheels 3, one of the chain wheels being driven by means of a motor 33 fixed on the milling arm 1. Milling tools 14 are fixed on the milling chain 2, these being for example formed as cutters, chippers or the like and serving for breaking away the material stored in the silo. Moreover, these tools guide the material in the direction towards the central opening 4, through which the material passes into the hopper 12.

Figure 4:
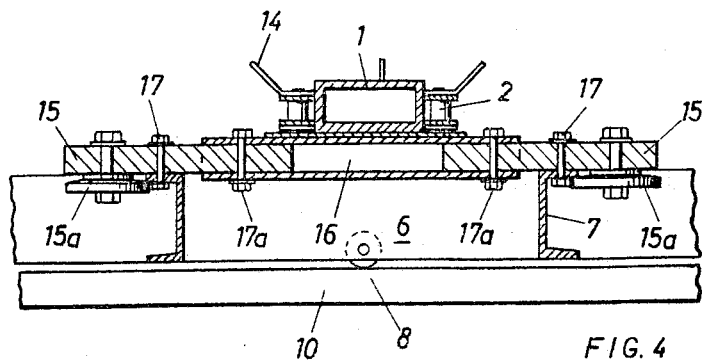
FIG. 4 is a cross sectional view of the milling arm along the line IV—IV of FIG. 3.

The reinforcing beams 7 serve for fixing the milling arm 1 onto the rotary carriage 5. Transverse latches 16 extend laterally from the milling arm 1 (see FIG. 4) and these receive supporting members 15 in suitable recesses. The supporting members 15 are telescopically slidably mounted in the recesses of the transverse latches 16 and can be fixed therein by means of screws 17a. In this manner, the extent to which the supporting members 15 laterally project from the milling arm 1 can be set.

The supporting members 15 project so far from the milling arm 1 that they bridge the distance between the two reinforcing beams 7, so that the milling arm 1 with the supporting members 15 rests on the upper side of the reinforcing beams 7. With the aid of screws 17 or equivalent fixing means, the milling arm 1, by means of its supporting members 15 can be rigidly connected with the rotary carriage.

In a preferred embodiment of a device according to the invention, rollers 15a are fixed on the supporting members 15, these facilitating sliding of the milling arm 1 on the reinforcing beams 7.

Figure 3:
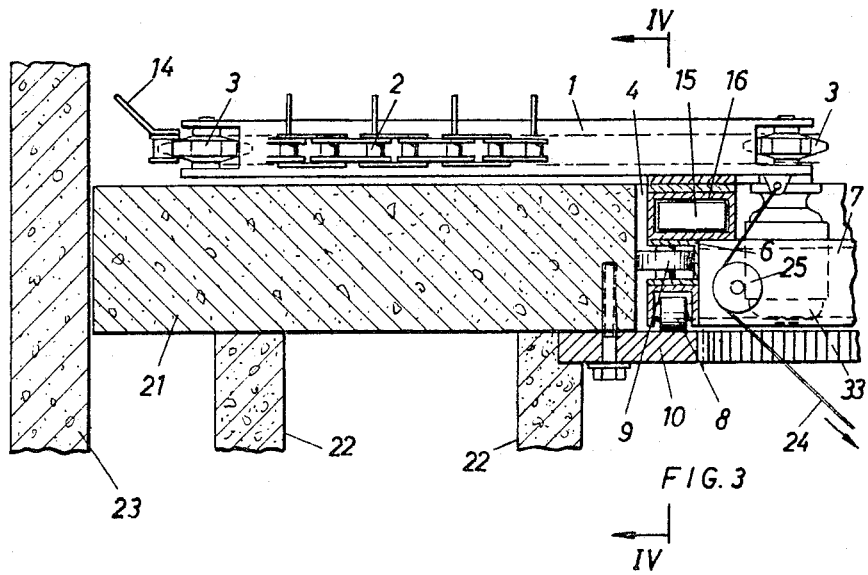
FIG. 3 is a side elevation showing the milling arm displaced into its working position.

For the purpose of easier sliding of the milling arm 1 on the rotary carriage 5, a cable traction arrangement is provided which comprises a cable 24 and a cable roller 25 (see FIG. 3).

The milling arm 1 is mounted on the rotary carriage 5, for example by means of suitable spacing blocks, at such a height that when in the condition illustrated in FIG. 3, in which the milling arm 1 extends over the annular base 21, it is held at a predetermined spacing from this base 21. In this manner, the milling arm 1 can sweep over the base 21 on rotation of the rotary carriage 5.

As will be seen from FIG. 1, the central opening of the base 21 has a diameter Dz which is of the same order of magnitude as the length A of the milling arm, but is preferably somewhat greater than this length. Advantageously, the diameter Dz amounts to about one third of the diameter of the cylindrical outer wall 23 of the silo.

Since the length of the milling arm 1 corresponds approximately to the diameter of the central opening 4, the milling arm can be applied without difficulty onto the rotary carriage 5 from below. As soon as the milling arm 1 with its supporting members 15 rests on the stiffening beams 7 of the rotary carriage 5 it can be readily slid into its working position where it extends over the annular base 21. Since the motor 33 is fixedly connected with the milling arm 1, the milling arm can rotate during the outward feed of the milling arm, so that the outward movement of the milling arm into its working position can be very easily achieved. The outward movement can moreover be effected with the aid of the above described cable arrangement 24, 25.

As soon as the milling arm has been brought into its working position, in which it extends over the annular base 21, it is fixed in this position on the stiffening beams with the aid of the screws 17 or with the aid of other fixing means. The motor 29 can now be operated so as to cause the rotation of the rotary carriage 5, the milling arm then cutting material from the contents of the silo and carrying the material towards the central opening 4 for discharge therethrough. In order always to obtain a free arch in the material above the rotary carriage 5, hook-shaped tools 34 may be provided on the rotary carriage, which extend upwardly and prevent falling of the material onto the carriage.

The device according to the invention which is described above also has the advantage that the milling arm can easily be applied from below centrally onto the rotary carriage 5 and is then displaceable in the direction towards the periphery of the central opening, into the working position. In this position, the milling arm is essentially clear of the central opening, so that it does impede removal of material from the silo through the central opening.

The electric supply lines to the motors 29 and 23 may be arranged in known manner, for example by use of slip rings, but such known arrangements will not be further described.

A further advantage of the device according to the invention is to be recognized in the fact that the milling arm 1 can be fixed on its supporting members 15 in any desired distance from the central point of the silo, on the rotary carriage. Accordingly, the use of the rotary arm is not limited to a silo having a given diameter, it being possible to use the milling arm with silos of different diameters, by suitably adjusting the degree of extension of the milling arm from the center of the silo in question. A further advantage consists in that the milling arm mounted on the rotary carriage in the above described manner is readily accessible and thus can be maintained and supervised without difficulty. Moreover, in the device according to the invention, it is favorable if the milling arm is horizontally disposed over a likewise horizontally extending silo base 21. In this way, the provision of silo bases which extend conically is avoided, it being understood that such silo bases are difficult to manufacture and are difficult to fix in the silo.

Modifications of the invention described are possible within the spirit and scope of the claims attached to this specification. Thus for example the milling arm 1 may be formed as a rotating cutter shaft which has cutting and conveying tool. The roundabout-like rotary carriage 5, instead of being guided on a guide track 10, may have a central shaft on which it is mounted for rotation.

I claim:

1. In a silo having a cylindrical outer wall and an annular base with a central opening, a device for removing stored material from said silo, said device comprising a circular member extending through said opening, means to mount said member for rotation within and respect to said opening, a pair of parallel beams extending across said member, a support member mounted on said beams for longitudinal sliding movement with respect thereto, and a milling arm carried by said support member and adapted to extend to the outer wall of said silo upon said support member being moved to a predetermined position with respect to said beams.

2. The device of claim 1 wherein said mounting means comprises an annular track mounted on the underside of said opening and a plurality of rolling members rotatably mounted on said annular member and adapted to engage said track and the inner wall of said opening.

3. A device as defined in claim 1 further comprising a roller mounted at each end of said support member and engaging a corresponding beam to provide said longitudinal sliding movement.

4. A device as defined in claim 1 further comprising means to fix said support member with respect to said beams.

5. A device as defined in claim 1 wherein said support member comprises inner and outer telescoping members, and means to fix said telescoping members in a predetermined position according to the space between said beams.

6. A device as defined in claim 1 further comprising a drive means carried by said circular member for rotating said circular member relative to said opening.

7. A device as defined in claim 1 further comprising a plurality of chain wheels mounted on said milling arm, a milling chain running over said chain wheels and means to drive at least one of said chain wheels.

8. A device as defined in claim 7 further comprising a plurality of milling tools carried by said chain.

9. A device as defined by claim 1 wherein said milling arm is of a length so that it is substantially clear of said opening when it extends to the outer wall of said silo.

10. A device as defined in claim 1 wherein said milling arm has a length substantially equal to the diameter of the central opening of the base and approximately equal to one third of the diameter of the silo.

11. A device as defined in claim 1 wherein said milling arm is so dimensioned as to be horizontally applicable with respect to said circular member and thereafter movable into a horizontal working position thereon.

12. A device as defined in claim 1 further comprising upwardly projecting hooks extending from said circular member for supporting the material contained in said silo during rotation of said circular member.

13. A device as defined in claim 1 further comprising a hopper with a discharge opening arranged below said opening.

14. A device as defined in claim 1 further comprising means disposed on said circular member for moving said support member with respect to said beams to extend said milling arm.

15. In a silo having a cylindrical outer wall and an annular base in its interior, with said base having a central opening, a device for removing stored material from said silo, said device comprising a roundabout-like rotary carriage arranged in the region of said central opening, and comprising a circularly bent rail, transverse beams reinforcing said rails, and horizontally rotating and vertically rotating rollers mounted in said rail, said horizontally rotating rollers running on an inner peripheral wall of said central opening, said vertically rotating rollers running on a track fixed to the periphery of said central opening, a milling arm having laterally projecting supporting member extending transversely to its longitudinal axis and engaging said beams for mounting and positionally fixing said milling arm with respect to said carriage, said milling arm being so dimensioned as to be applicable from below through said central opening of the silo base centrally onto said rotary carriage, a cable arrangement adapted for moving said milling arm in the direction towards the periphery of said central opening into a position in which it extends over the annular base, and means adapted for fixing said milling arm in the extended position on said rotary carriage in such manner that it is essentially clear of the central opening.

16. A device as defined in claim 15, further comprising upwardly projecting hooks arranged on said rotary carriage, for supporting the material contained in said silo, during rotation of said rotary carriage.

17. A device as defined in claim 16, further comprising a hopper with a discharge opening, arranged below said rotary carriage in the region of said central opening of the silo base.

References Cited by the Examiner

UNITED STATES PATENTS 2,322,146 6/1943 Kuhn.
3,190,468 6/1965 Kocher _____ 214—17

GERALD M. FORLENZA, *Primary Examiner.*

ROBERT G. SHERIDAN, *Examiner.*